(12) United States Patent
Zheng et al.

(10) Patent No.: US 10,478,731 B2
(45) Date of Patent: Nov. 19, 2019

(54) METHOD AND APPARATUS FOR STORING USER DATA

(71) Applicant: TENCENT TECHNOLOGY (SHENZHEN) COMPANY LIMITED, Shenzhen (CN)

(72) Inventors: Jinhong Zheng, Shenzhen (CN); Xiaomin Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 210 days.

(21) Appl. No.: 15/639,962

(22) Filed: Jun. 30, 2017

(65) Prior Publication Data

US 2017/0296928 A1     Oct. 19, 2017

Related U.S. Application Data

(63) Continuation of application No. PCT/CN2016/070322, filed on Jan. 6, 2016.

(30) Foreign Application Priority Data

Jan. 6, 2015     (CN) .......................... 2015 1 0005241

(51) Int. Cl.
*A63F 13/79*     (2014.01)
*A63F 13/73*     (2014.01)
(Continued)

(52) U.S. Cl.
CPC ............ *A63F 13/79* (2014.09); *A63F 13/335* (2014.09); *A63F 13/73* (2014.09); *H04L 29/06* (2013.01);
(Continued)

(58) Field of Classification Search
CPC ........ A63F 13/79; A63F 13/335; A63F 13/73; A63F 2300/535; H94L 29/06; H04L 67/306; H04L 67/38; H04L 67/42
See application file for complete search history.

(56) References Cited

U.S. PATENT DOCUMENTS

2013/0123000 A1   5/2013  Kusuda et al.
2013/0137515 A1   5/2013  Kusuda et al.
(Continued)

FOREIGN PATENT DOCUMENTS

CN     1691042 A     11/2005
CN     1963829 A      5/2007
(Continued)

OTHER PUBLICATIONS

International Search Report for International Application No. PCT/CN2015/070322 dated Mar. 25, 2016.

*Primary Examiner* — Werner G Garner
(74) *Attorney, Agent, or Firm* — Knobbe Martens Olson & Bear LLP

(57) ABSTRACT

A method and an apparatus for storing user data are provided. In some embodiments, the method includes receiving a login request; generating an interactive data identification and a first game data identification based on a designated user identification and a first game scene identification included in the login request, the interactive data identification is configured to indicate interactive user data, and the first game data identification is configured to indicate first game user data corresponding to the first game scene; generating the interactive user data based on an interactive operation executed by the terminal and storing the interactive data identification and the interactive user data correspondingly; and generating the first game user data based on a game operation executed by the terminal in the first game
(Continued)

scene and storing the first game data identification and the first game user data correspondingly.

18 Claims, 5 Drawing Sheets

(51) Int. Cl.
    *H04L 29/06*     (2006.01)
    *H04L 29/08*     (2006.01)
    *A63F 13/335*     (2014.01)

(52) U.S. Cl.
    CPC ............ *H04L 67/306* (2013.01); *H04L 67/38* (2013.01); *A63F 2300/535* (2013.01); *H04L 67/42* (2013.01)

(56) References Cited

U.S. PATENT DOCUMENTS

2014/0287827 A1*   9/2014   Chan ................... A63F 13/12
                                                                               463/29
2014/0357376 A1   12/2014   Rao et al.

FOREIGN PATENT DOCUMENTS

| CN | 101877031 | 11/2010 |
|----|-----------|---------|
| CN | 103079660 | 5/2013  |
| CN | 103096987 | 5/2013  |
| CN | 104601564 | 5/2015  |

* cited by examiner

METHOD AND APPARATUS FOR STORING USER DATA

The application a continuation application of International Patent Application No. PCT/CN2016/070322, filed on Jan. 6, 2016, which claims priority to Chinese Patent Application No. 201510005241.X, titled "Method and apparatus for storing user data", filed on Jan. 6, 2015 with the State Intellectual Property Office of the People's Republic of China, both of which are incorporated herein by reference.

TECHNICAL FIELD

The present disclosure relates to the field of network technology, and in particular to a method and an apparatus for storing user data.

BACKGROUND

With the development of Internet technology, there are more and more online games and user requirements on game effects are getting higher and higher. In order to provide abundant gaming experiences for users, a game server can establish an online game community for providing multiple game scenes for users. A user can experience different game roles in different game scenes. The game server can generate different game user data based on a game operation executed by the user, such as generate different roles for the user in different game scenes to obtain different gaming equipments. The user can also interact with other users in the online game community. For example, the user can publish information, browse information published by other users, or chat with other users. The game server can generate interactive user data based on an interactive operation of the user.

The game user data and the interactive user data are collectively referred to as user data. The user can log into the game server using a user account. The game server correspondingly stores the user account and generated user data, and identifies the user data according to the user account. In this way, when subsequently the game server receives a processing request from the user account for processing the current user data, the game server can firstly determine whether the user is currently in the interactive scene or in a game scene according to the current application scene, to determine whether interactive user data or game user data is to be processed, and then acquire user data corresponding to the judgment result according to the user account and process the acquired user data.

However, by using the method that the interactive user data and the game user data are identified by only the user account, it needs to determine whether the user is currently in an interactive scene or in a game scene to determine whether the interactive user data or the game user data is to be performed, in a case that the current user data is to be processed in a subsequence process. The above operations are cumbersome.

SUMMARY

The present disclosure provides a method and an apparatus for storing user data.

In one aspect, a method for storing user data is provided. The method includes:

receiving a login request of a terminal, where the login request includes a designated user identification of the terminal and a first game scene identification, and the first game scene identification is configured to indicate a first game scene to be entered by the terminal;

generating an interactive data identification and a first game data identification based on the designated user identification and the first game scene identification, where the interactive data identification is configured to indicate interactive user data, and the first game data identification is configured to indicate first game user data corresponding to the first game scene;

generating the interactive user data based on an interactive operation executed by the terminal, and storing the interactive data identification and the interactive user data correspondingly; and generating the first game user data based on a game operation executed by the terminal in the first game scene, and storing the first game data identification and the first game user data correspondingly.

In an implementation, the method further includes:
receiving a data processing request;
acquiring the interactive user data stored correspondingly to the interactive data identification in a case that the data processing request includes the interactive data identification; and
processing the acquired interactive user data based on the data processing request.

In an implementation, the method further includes:
receiving a data processing request;
acquiring the first game user data stored correspondingly to the first game data identification in a case that the data processing request includes the first game data identification; and
processing the acquired first game user data based on the data processing request.

In an implementation, the method further includes:
receiving a scene switching request sent by the terminal, where the scene switching request includes the designated user identification and a second game scene identification, and the second game scene identification is configured to indicate a second game scene to be entered by the terminal;
generating a second game data identification based on the designated user identification and the second game scene identification, where the second game data identification is configured to indicate second game user data corresponding to the second game scene;
setting the first game data identification to be an offline state;
setting the second game data identification to be an online state;
generating the second game user data based on a game operation executed by the terminal in the second game scene; and
storing the second game data identification and the second game user data correspondingly.

In an implementation, after generating the interactive data identification and the first game data identification based on the designated user identification and the first game scene identification, the method further includes:
setting the interactive data identification to be an online state; and
setting the first game data identification to be an online state.

In an implementation, generating the interactive data identification and the first game data identification based on the designated user identification and the first game scene identification includes:

generating the interactive data identification based on the designated user identification and a first character adjustment rule; and generating the first game data identification based on the designated user identification, the first game scene identification and a second character adjustment rule.

In another aspect, a method for storing user data is provided. The method includes:

receiving, by a login server, a login request sent by a terminal and sending, by the login server, the login request to a double online server, where the login request includes a designated user identification of the terminal and a first game scene identification, and the first game scene identification is configured to indicate a first game scene to be entered by the terminal;

generating, by the double online server, an interactive data identification and a first game data identification based on the designated user identification and the first game scene identification, where the interactive data identification is configured to indicate interactive user data, and the first game data identification is configured to indicate first game user data corresponding to the first game scene;

sending, by the double online server, the interactive data identification and the first game data identification to an event management server;

generating, by the event management server, the interactive user data based on an interactive operation executed by the terminal and storing the interactive data identification and the interactive user data correspondingly, and generating, by the event management server, the first game user data based on a game operation executed by the terminal in the first game scene and storing the first game data identification and the first game user data correspondingly.

In an implementation, the method further includes:

receiving, by the event management server, a data processing request sent by the terminal;

acquiring, by the event management server, the interactive user data stored correspondingly to the interactive data identification in a case that the data processing request includes the interactive data identification; and processing, by the event management server, the acquired interactive user data based on the data processing request.

In an implementation, the method further includes:

receiving, by the event management server, a data processing request sent by the terminal;

acquiring, by the event management server, the first game user data stored correspondingly to the first game data identification in a case that the data processing request includes the first game data identification; and processing, by the event management server, the acquired first game user data based on the data processing request.

In an implementation, the method further includes:

receiving, by the double online server, a scene switching request sent by the terminal, where the scene switching request includes the designated user identification and a second game scene identification, and the second game scene identification is configured to indicate a second game scene to be entered by the terminal;

generating, by the double online server, a second game data identification based on the designated user identification and the second game scene identification, where the second game data identification is configured to indicate second game user data corresponding to the second game scene;

sending, by the double online server, the second game data identification to an online status management server;

receiving, by the online status management server, the second game data identification, setting the first game data identification to be an offline state and setting the second game data identification to be an online state;

sending, by the double online server, the second game data identification to the event management server; and generating, by the event management server, the second game user data based on a game operation executed by the terminal in the second game scene and storing the second game data identification and the second game user data correspondingly.

In an implementation, after generating, by the double online server, the interactive data identification and the first game data identification based on the designated user identification and the first game scene identification, the method further includes:

sending, by the double online server, the interactive data identification and the first game data identification to the online status management server; and setting, by the online status management server, the interactive data identification to be an online state and setting, by the online status management server, the first game data identification to be an online state.

In an implementation, generating, by the double online server, the interactive data identification and the first game data identification based on the designated user identification and the first game scene identification includes:

generating, by the double online server, the interactive data identification based on the designated user identification and a first character adjustment rule; and generating, by the double online server, the first game data identification based on the designated user identification, the first game scene identification and a second character adjustment rule.

In another aspect, an apparatus for storing user data is provided. The apparatus includes a processor and a non-transitory storage medium having a plurality of instructions stored thereon that, when executed by the processor, cause the processor to:

receive a login request of a terminal, where the login request includes a designated user identification of the terminal and a first game scene identification, and the first game scene identification is configured to indicate a first game scene to be entered by the terminal;

generate an interactive data identification and a first game data identification based on the designated user identification and the first game scene identification, where the interactive data identification is configured to indicate interactive user data and the first game data identification is configured to indicate first game user data corresponding to the first game scene;

generate the interactive user data based on an interactive operation executed by the terminal and store the interactive data identification and the interactive user data correspondingly; and generate the first game user data based on a game operation executed by the terminal in the first game scene and store the first game data identification and the first game user data correspondingly.

In an implementation, the apparatus further includes instructions that cause the processor to:

receive a data processing request;

acquire the interactive user data stored correspondingly to the interactive data identification in a case that the data processing request includes the interactive data identification; and process the acquired interactive user data based on the data processing request.

In an implementation, the apparatus further includes instructions that cause the processor to:

receive a data processing request;

acquire the first game user data stored correspondingly to the first game data identification in a case that the data processing request includes the first game data identification; and process the acquired first game user data based on the data processing request.

In an implementation, the apparatus further includes instructions that cause the processor to:

receive a scene switching request sent by the terminal, where the scene switching request includes the designated user identification and a second game scene identification and the second game scene identification is configured to indicate a second game scene to be entered by the terminal;

generate a second game data identification based on the designated user identification and the second game scene identification, where the second game data identification is configured to indicate second game user data corresponding to the second game scene;

set the first game data identification to be an offline state and set the second game data identification to be an online state; and generate the second game user data based on a game operation executed by the terminal in the second game scene and store the second game data identification and the second game user data correspondingly.

In an implementation, the apparatus further includes instructions that cause the processor to:

set the interactive data identification to be an online state and set the first game data identification to be an online state.

In an implementation, the apparatus further includes instructions that cause the processor to:

generate the interactive data identification based on the designated user identification and a first character adjustment rule; and generate the first game data identification based on the designated user identification, the first game scene identification and a second character adjustment rule.

In the method and apparatus provided by embodiments of the present disclosure, when a login request of a terminal is received, an interactive data identification and a first game data identification are generated based on a designated user identification of the terminal and a first game scene identification of a game scene to be entered by the terminal. If interactive user data is generated based on an interactive operation executed by the terminal, the interactive data identification and the interactive user data are correspondingly stored. If first game user data is generated based on a game operation executed by the terminal in the first game scene, the first game data identification and the first game user data are correspondingly stored. The interactive data identification is configured to indicate the interactive user data and the first game data identification is configured to indicate the first game user data. User data in different scenes are isolated, thereby realizing uniqueness of indicated data and improving flexibility. User data to be processed can be determined based on the currently used data identification, and there is no need to determine which scene the user is currently in. The above operations are simple.

BRIEF DESCRIPTION OF THE DRAWINGS

The accompanying drawings used in embodiments are described briefly as follows, to make the technical solutions according to the embodiments in the present disclosure become clearer. It is to be noted that the accompanying drawings are only some embodiments of the present disclosure. Those skilled in the art can obtain other drawings according to these accompanying drawings without any creative work.

DETAILED DESCRIPTION OF THE EMBODIMENTS

The technical solution according to the embodiments of the present disclosure will be described clearly as follows in conjunction with the accompany drawings in the embodiments of the present disclosure. It is obvious that the described embodiments are only some embodiments according to the present disclosure. All other embodiments apparent to those skilled in the art based on the embodiments in the present disclosure are encompassed by the present disclosure.

Figure 1:
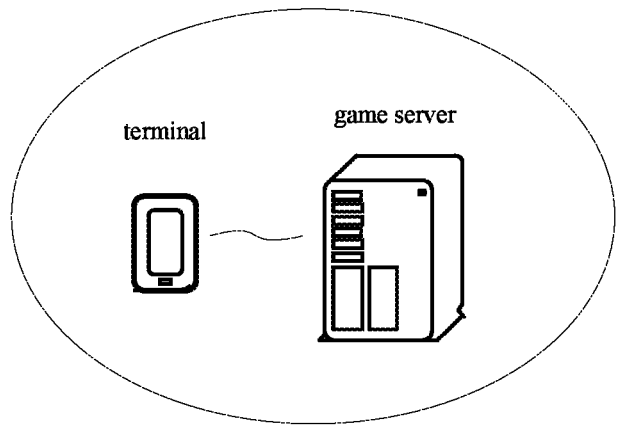
FIG. 1 is a schematic structural diagram of a game system according to an embodiment of the present disclosure.

FIG. 1 is a schematic structural diagram of a game system according to an embodiment of the present disclosure. The game system includes a terminal and a game server. The terminal and the game server are connected through a network. The game server provides multiple game scenes. The terminal can enter a game scene after logging into the game server. The terminal can execute a game operation or an interactive operation in the game scene. The game server may generate game user data or interactive user data based on the game operation or the interactive operation executed by the terminal.

The terminal is configured to send a login request to the game server. The login request includes a designated user identification of the terminal and a first game scene identification, the designated user identification is configured to indicate the terminal and the first game scene identification is configured to indicate a first game scene to be entered by the terminal.

Upon receipt of the login request, the game server generates an interactive data identification and a first game data identification based on the designated user identification and the first game scene identification. The interactive data identification is configured to indicate interactive user data, and the first game data identification is configured to indicate first game user data corresponding to the first game scene. The game server generates interactive user data based on the interactive operation executed by the terminal and correspondingly stores the interactive data identification and the interactive user data. The game server generates first game user data based on the game operation executed by the terminal in the first game scene and correspondingly store the first game data identification and the first game user data.

The game server may be a server cluster of a game system, or any one server in the server cluster, or any functional module in a server, which is not limited in the present disclosure.

Figure 2:
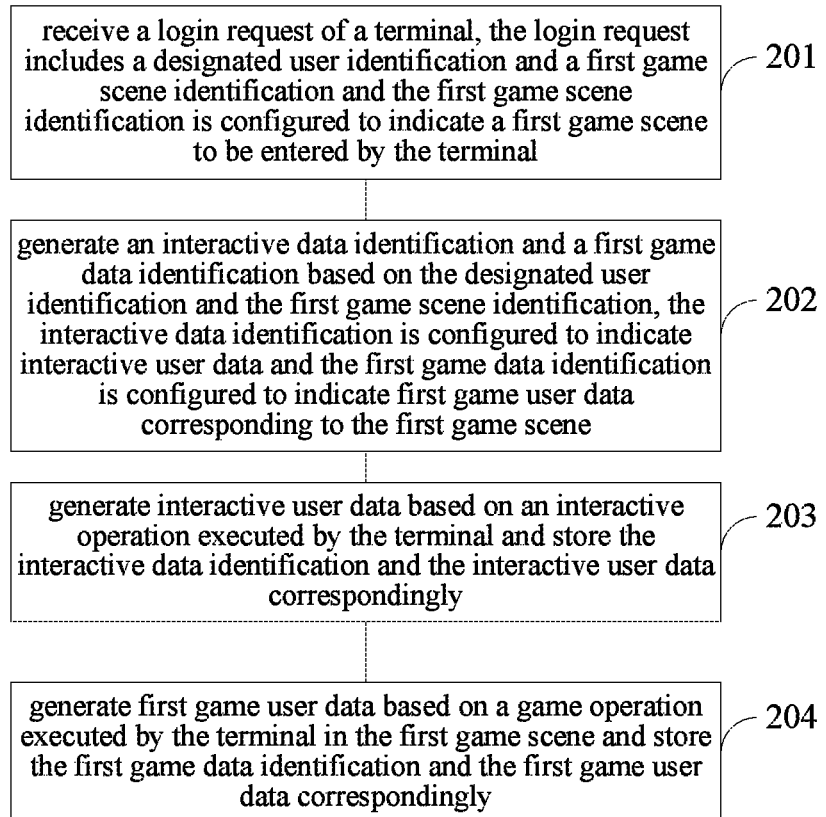
FIG. 2 is a flow chart of a method for storing user data according to an embodiment of the present disclosure.

FIG. 2 is a flow chart of a method for storing user data according to an embodiment of the present disclosure. The method is performed by a game server. Referring to FIG. 2, the method includes the following steps 201 to 204.

In step 201, a login request of a terminal is received. The login request includes a designated user identification and a first game scene identification, and the first game scene identification is configured to indicate a first game scene to be entered by the terminal.

In step 202, an interactive data identification and a first game data identification are generated based on the designated user identification and the first game scene identification. The interactive data identification is configured to indicate interactive user data, and the first game data identification is configured to indicate first game user data corresponding to the first game scene.

In step 203, interactive user data is generated based on an interactive operation executed by the terminal, and the interactive data identification and the interactive user data are correspondingly stored.

In step 204, first game user data is generated based on a game operation executed by the terminal in the first game scene, and the first game data identification and the first game user data is correspondingly stored.

In the method provided by the present disclosure, when a login request of a terminal is received, an interactive data identification and a first game data identification are generated based on a designated user identification of the terminal and a first game scene identification of a game scene to be entered by the terminal. If interactive user data is generated based on an interactive operation executed by the terminal, the interactive data identification and the interactive user data are correspondingly stored. If first game user data is generated based on a game operation executed by the terminal in the first game scene, the first game data identification and the first game user data are correspondingly stored. The interactive data identification can be configured to indicate the interactive user data and the first game data identification can be configured to indicate the first game user data. User data in different scenes are isolated, thereby realizing uniqueness of indicated data and improving flexibility. User data to be processed can be determined based on the currently used data identification, and there is no need to determine which scene the user is currently in. The above operations are simple.

In an implementation, the method further includes:
receiving a data processing request;
acquiring the interactive user data stored correspondingly to the interactive data identification in a case that the data processing request includes the interactive data identification; and
processing the acquired interactive user data based on the data processing request.

In an implementation, the method further includes:
receiving a data processing request;
acquiring the first game user data stored correspondingly to the first game data identification in a case that the data processing request includes the first game data identification; and
processing the acquired first game user data based on the data processing request.

In an implementation, the method further includes:
receiving a scene switching request sent by the terminal, where the scene switching request includes the designated user identification and a second game scene identification, and the second game scene identification is configured to indicate a second game scene to be entered by the terminal;
generating a second game data identification based on the designated user identification and the second game scene identification, where the second game data identification is configured to indicate second game user data corresponding to the second game scene;
setting the first game data identification to be an offline state;
setting the second game data identification to be an online state;
generating the second game user data based on a game operation executed by the terminal in the second game scene; and
storing the second game data identification and the second game user data correspondingly.

In an implementation, after generating the interactive data identification and the first game data identification based on the designated user identification and the first game scene identification, the method further includes:
setting the interactive data identification to be an online state; and
setting the first game data identification to be an online state.

In an implementation, generating the interactive data identification and the first game data identification based on the designated user identification and the first game scene identification includes:
generating the interactive data identification based on the designated user identification and a first character adjustment rule; and
generating the first game data identification based on the designated user identification, the first game scene identification and a second character adjustment rule.

All the above implementations can be combined with each other arbitrarily if there is no conflict, which is not described in detail herein.

Figure 3:
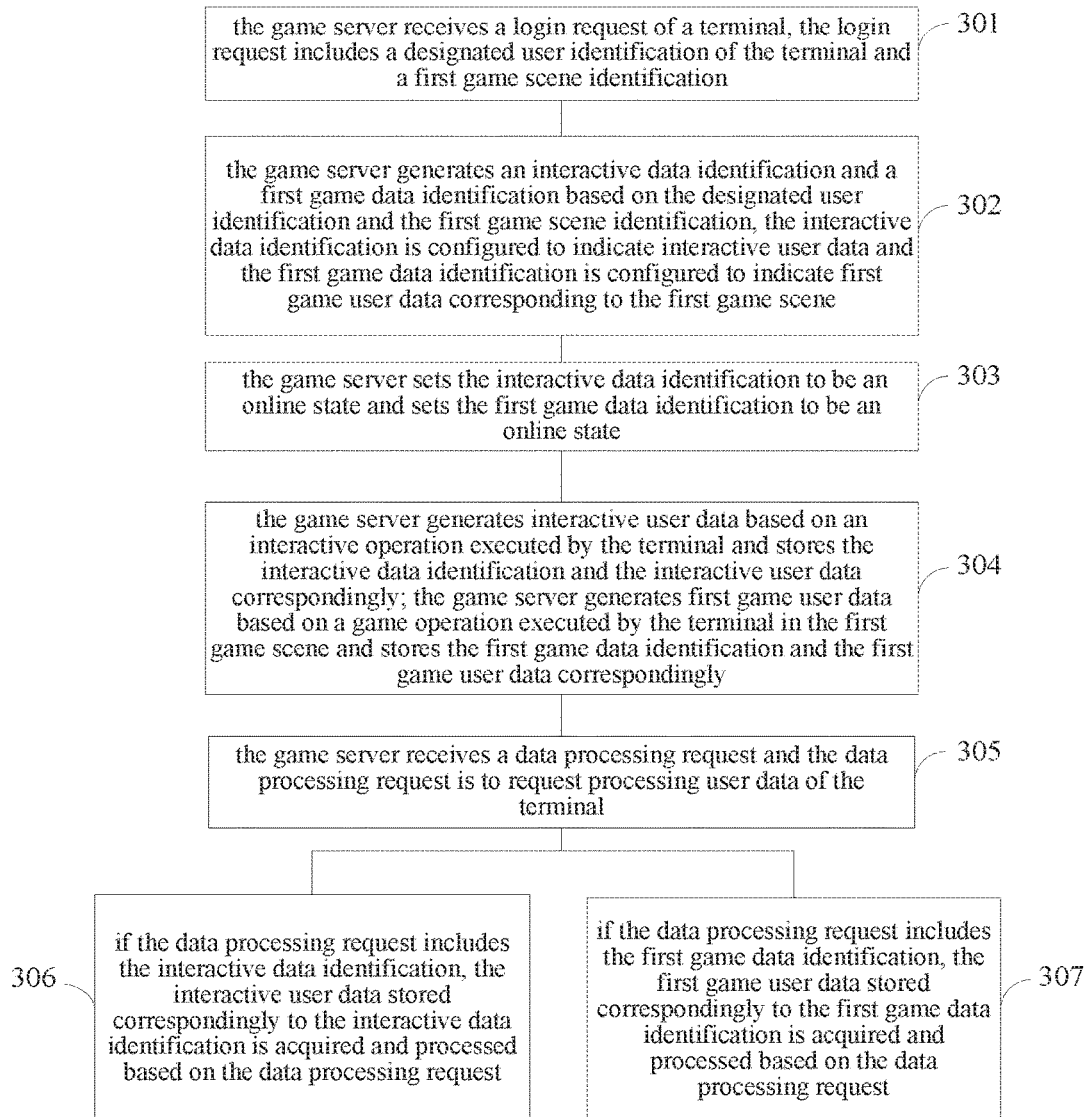
FIG. 3 is a flow chart of a method for storing user data according to an embodiment of the present disclosure.

FIG. 3 is a flow chart of a method for storing user data according to another embodiment of the present disclosure. The method is performed by a game server. Referring to FIG. 3, the method includes the follow steps 301 to 307.

In step 301, the game server receives a login request of a terminal. The login request includes a designated user identification of the terminal and a first game scene identification.

According to one of the embodiments of the present disclosure, the game server provides multiple game scenes for the terminal and provides different roles for the terminal user in the different game scenes, and thus generates different game user data based on game operations of the user. The terminal may be, for example, a smart phone, a computer or a game machine, which is not limited herein.

The terminal may select a first game scene to be entered from multiple game scenes when the terminal logs into the game server. The terminal obtains a first game scene identification of the first game scene and sends a login request to the game server. The login request includes the first game scene identification and a designated user identification of the terminal. The game server receives the login request. The first game scene identification, which may be for example a name or a scene number of the first game scene, is configured to indicate the first game scene. The designated user identification, which may be for example a telephone number, a user account number, a device number or a network address of the terminal, is configured to indicate the terminal.

In step 302, the game server generates an interactive data identification and a first game data identification based on the designated user identification and the first game scene identification. The interactive data identification is configured to indicate interactive user data, and the first game data identification is configured to indicate first game user data corresponding to the first game scene.

The terminal in the first game scene may execute a game operation, such as moving a position in the first game scene, or purchasing game equipments. When a game operation is executed by the terminal, the game server generates game user data for the terminal based on the game operation. The terminal may also execute an interactive operation in the first game scene, such as chatting with other users or publishing information. When an interactive operation is executed by the terminal, the game server generates interactive user data for the terminal based on the interactive operation. The game user data and the interactive user data generated by the game server are all user data of the terminal. The game user data and the interactive user data of the terminal are identified separately, which is different from user data of other terminals conventionally.

If the game user data and the interactive user data are indicated by only the designated user identification, the game user data and the interactive user data cannot be distinguished from each other, and the uniqueness of indicating user data cannot be achieved. Therefore, the game server generates an interactive data identification and a first game data identification based on the designated user identification and the first game scene identification, where the interactive data identification is configured to indicate interactive user data and the first game data identification is configured to indicate game user data corresponding to the first game scene.

In an implementation, the game server generating the interactive data identification and the game data identification may include: generating an interactive data identification based on the designated user identification and a first predetermined character adjustment rule; and generating a first game data identification based on the designated user identification, the first game scene identification and a second predetermined character adjustment rule.

The game server generates an interactive data identification based on the designated user identification and generates the first game data identification based on the designated user identification and the first game scene identification. A first character adjustment rule configured to generate an interactive data identification is pre-stored in the game server. The game server may process the designated user identification based on the first character adjustment rule, to obtain an interactive data identification. The game server may add preset characters to characters of the designated user identification, to obtain the interactive data identification. The position of the preset characters in the interactive data identification may be set by a technician arbitrarily. For example, the first character adjustment rule may be that "an interactive data identification=user identifications of 9 digits+0". If the designated user identification is "803429430", the interactive data identification is "8034294300". In a subsequent process, the game server can determine that the designated user identification is "803429430" based on the interactive data identification "8034294300". The game server may determine the corresponding designated user identification based on the interactive data identification and the first character adjustment rule, so the interactive data identification can not only indicate the interactive user data, but also indicate the terminal.

The game server may also pre-store a second character adjustment rule, which is configured to generate the game data identification. The game server may process the designated user identification and the first game scene identification based on the second character adjustment rule, to obtain the first game data identification. The game server may add preset characters and characters of the first game scene identification to characters of the designated user identification, to obtain a game data identification. For example, the second character adjustment rule may be that "a game data identification=user identifications of 9 digits+ 1+game scene identification of 2 digits". If the designated user identification is "803429430" and the first game scene identification is "15", the first game data identification is "803429430115". In a subsequent process, the game server can determine that the designated user identification is "803429430" and the corresponding game scene identification is "15" based on the first game data identification "803429430115". The game server may determine the corresponding designated user identification and the game scene identification based on the first game data identification and the second character adjustment rule, so the first game data identification can not only indicate the game user data, but also indicate the terminal and the first game scene.

In addition, the interactive data identification and the game data identification may be binary data with preset digits. The preset digits may be 64 digits or 128 digits, which is not limited herein.

According to another embodiment of the present disclosure, after generating the interactive data identification and the first game data identification based on the designated user identification and the first game scene identification, the game server may further establish a correspondence among the designated user identification, the interactive data identification and the first game data identification. In practice, the correspondence may include correspondence among designated user identification of each logged-in terminal and the corresponding interactive data identification and game data identification. In this case, when a terminal logs into the game server based on a user identification, the game server may directly search for an interactive data identification and a game data identification corresponding to the user identification based on the correspondence. When the terminal performs an interactive operation based on an interactive data identification, the game server may directly search for a use identification corresponding to the interactive data identification based on the correspondence. When the terminal performs a game operation based on a game data identification, the game server may directly search for a use identification corresponding to the game data identification based on the correspondence, which is not limited herein.

When a terminal logs into the game server based on a user identification, the corresponding interactive data identification and game data identification are generated based on the first character adjustment rule and the second character adjustment rule. Alternatively, when a terminal logs into the game server based on a user identification, the corresponding interactive data identification and game data identification are searched for based on a built correspondence. In this case, each time the terminal logs into the game server, the generated interactive data identification is the same, and each time the terminal enters a same game scene, the generated game data identification is also the same. Thereby, the same interactive data identification can be used to indicate interactive user data generated during multiple logins, and the same game data identification can be used to indicate game user data generated during multiple logins, to unify the storing mode of user data and improve organization of storing user data.

In step 303, the game server sets the interactive data identification to be an online state and sets the first game data identification to be an online state.

After generating the interactive data identification and the first game data identification based on the designated user identification, the game server sets the interactive data identification to be an online state and sets the first game data identification to be an online state in response to the login request. The game server then considers the terminal as two users: a user for the interactive data identification and a user for the first game data identification. An interactive operation of the terminal is processed based on the interactive data identification, and a game operation of the terminal is processed based on the first game data identification.

The game server may provide an entrance for the terminal in the first game scene to enter into other game scenes. When a click operation on an entry to other game scene is detected, the terminal triggers a scene switching request to request the game server to switch the terminal to the other game scene. Specially, when a click operation on an entry to a second game scene is detected, the terminal sends a scene switching request to the game server. The scene switching request includes the designated user identification and a second game scene identification, and the second game scene identification is configured to indicate a second game scene to be entered by the terminal. The game server generates a second game data identification based on the designated user identification and the second game scene identification. The second game data identification is configured to indicate second game user data corresponding to the second game scene. The game server then sets the first game data identification to an offline state and sets the second game data identification to an online state. In this way, the second game data identification and second game user data can be correspondingly stored after the second game user data is generated based on a game operation executed by the terminal in the second game scene in a subsequence process. The generation for the second game data identification is similar as the generation for the first game data identification, which is not described in detail herein.

Conventionally, used data is indicated by only the user identification. In this case, when a new game scene is entered, a new game scene identification is added into user data stored correspondingly to the user identification, and game user data generated in the new game scene needs to be added correspondingly. The above processes of adding require modifying data structure, which results in complex realization and poor scalability. According to one of the embodiments of the present disclosure, the game server generates separate game data identification for each game scene and the different game data identifications indicate game user data generated in different game scenes, so that user data in different game scenes can be isolated. In this case, when a game scene is switched, the current game data identification is logged out and a new game scene identification is generated, which results in simple operations and strong extensibility.

It is to be noted that, the game server sets the interactive data identification to be an online state and sets the first game data identification to be an online state in response to the login request. In practice, in response to the login request of the terminal, the game server may execute multiple other operations. For example, the game server may generate login event information based on the login request of the terminal and sends the login event information to other servers which subscribe to login event, to prompt other servers for the login event. The game server may further execute other operations in response to the login request, which is not limited herein.

In step 304, the game server generates interactive user data based on an interactive operation executed by the terminal, and stores the interactive data identification and the interactive user data correspondingly. The game server generates first game user data based on a game operation executed by the terminal in the first game scene, and stores the first game data identification and the first game user data correspondingly.

In one of the embodiments, when the terminal executes an interactive operation in the first game scene, the terminal sends an interactive request corresponding to the interactive operation to the game server. The interactive request includes the designated user identification. Upon receipt of the interactive request, the game server processes the interactive request and obtains interactive user data. The game server obtains the corresponding interactive data identification based on the designated user identification and stores the interactive data identification and the interactive user data correspondingly.

For example, the game server receives a request for releasing information by the terminal, the information is released in the first game scene, and interactive user data is generated after the release. The interactive user data may include, for example, the information, releasing time of the information, and other users' comments on the information. The interactive data identification and the interactive user data are correspondingly stored.

When the terminal executes a game operation in the first game scene, the terminal sends a game request corresponding to the game operation to the game server. The game request includes the designated user identification. Upon receipt of the game request, the game server processes the game request and obtains game user data. The game server obtains the corresponding game data identification based on the designated user identification and stores the game data identification and the game user data correspondingly.

For example, when the game server receives a request for purchasing game equipment by the terminal, the game server transfers resources corresponding to the game equipment to a seller of the game equipment and assigns the game equipment to the terminal. Game user data can be obtain in this process. The game user data may include the game equipment, purchasing time of the game equipment, transferred resources for purchasing the game equipment, and the seller of the game equipment. The game data identification and the game user data are correspondingly stored.

In step 305, the game server receives a data processing request and executes step 306 or step 307.

In the process of performing an operation by the terminal in the first game scene, the game server may request other servers to process interactive user data of the terminal based on the interactive data identification, or request other servers to process game user data of the terminal based on the first game data identification. Alternatively, the game server may process interactive user data and game user data. In the case of processing by other servers, the other servers may send a data processing request for the terminal to the game server and request processing user data of the terminal. The data processing request may include the interactive data identification, and may also include the first game data identification. If the data processing request includes the interactive data identification, it is indicated that the data processing request is to request processing the interactive user data, then the interactive user data stored correspondingly to the interactive data identification is acquired, and the acquired interactive user data is processed based on the data processing request. If the data processing request includes the first game data identification, it is indicated that the data processing request is to request processing the first game user data, then first game user data stored correspondingly to the first game data identification is acquired, and the acquired first game user data is processed based on the data processing request.

In step 306, in a case that the data processing request includes the interactive data identification, the interactive user data stored correspondingly to the interactive data identification is acquired. The acquired interactive user data is processed based on the data processing request.

For example, if the game server receives a request for searching a history record and the request includes the interactive data identification, the game server acquires interactive user data stored correspondingly to the interactive data identification, extracts a user interactive record from the interactive user data and returns the user interactive record to the server that triggers the request.

In step 307, in a case that the data processing request includes the first game data identification, the first game user data stored correspondingly to the first game data identification is acquired. The acquired first game user data is processed based on the data processing request.

For example, if the game server receives a request for upgrading game level and the request includes the game data identification and a designated level to be upgraded to, the game server acquires game user data stored correspondingly to the game data identification and sets the user game level in the game user data to be the designated level.

It is to be noted that the above embodiments are described by taking only the game server that performs the steps in the method as an example. In practice, the method of the embodiments can be applied to multiple servers of a game system, which is not limited herein.

For example, the game system may include a terminal and a server cluster. The server cluster may include a login server, a double online server and other servers. The login server is configured to process a login request of a terminal. The double online server is configured to generate an interactive data identification and a game data identification. The other servers are configured to process user data of the terminal. For example, the above step 301 may be performed by the login server, the above steps 302 and 303 may be performed by the double online server, and the above steps 304 to 307 may be performed by any server in the server cluster.

When a terminal is to log into a first game scene, the terminal sends a login request to the login server. The login request includes a designated user identification and a first game scene identification. The login server forwards the login request to the double online server. The double online server generates an interactive data identification and a first game data identification based on the designated user identification and the first game scene identification. The double online server then may interact with other servers to process interactive user data based on the interactive data identification and an interactive operation executed by the terminal; and interact with other servers to process game user data based on the first game data identification and a game operation executed by the terminal.

For example, the server cluster includes a login server, a double online server, a broadcast server, an online status management server and an event management server. The broadcast server is configured to generate a message to be broadcasted. The online status management server is configured to manage the online/offline state of the terminal. The event management server is configured to manage events occurred in the game system. Hereinafter, the process of processing user data of the terminal is described by examples.

Figure 4A:
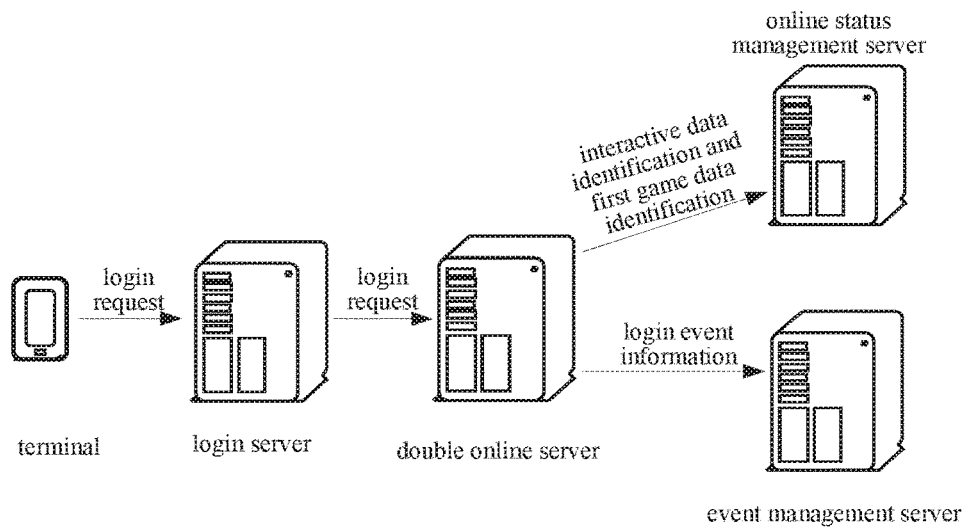
FIG. 4A is a signaling diagram of a login process according to an embodiment of the present disclosure.

(1) Referring to FIG. 4A, taking a login process as an example, the terminal sends a login request to the login server. The login request includes the designated user identification and the first game scene identification. The login server forwards the login request to the double online server. The double online server, after generating an interactive data identification and a first game data identification based on the designated user identification and the first game scene identification, sends the interactive data identification and the first game data identification to the online status management server. Upon receipt of the interactive data identification and the first game data identification, the online status management server sets the interactive data identification and the first game data identification to be an online state. The double online server sends login event information to the event management server. The login event information includes the interactive data identification and the first game data identification. Upon receipt of the login event information, the event management server may determine that login event occurs for the interactive data identification and the first game data identification.

Figure 4B:
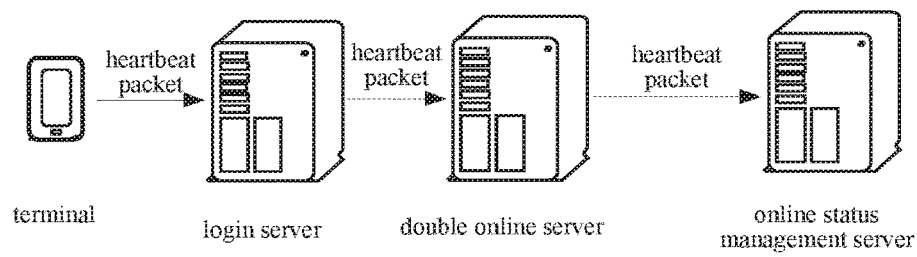
FIG. 4B is a signaling diagram for processing a heartbeat packet according to an embodiment of the present disclosure.

(2) Referring to FIG. 4B, taking a process of a heartbeat packet as an example, in order to maintain a long connection between the terminal and the server cluster, the terminal periodically sends a heartbeat packet to the server cluster. Specifically, the terminal periodically sends a heartbeat packet to the login server. The heartbeat packet includes the designated user identification. Upon receipt of the heartbeat packet, the login server sends the heartbeat packet to the double online server. Upon receipt of the heartbeat packet, the double online server determines the interactive data identification and the first game data identification based on the designated user identification, and sends a heartbeat packet of the interactive data identification and a heartbeat packet of the first game data identification to the online status management server. The online status management server maintains the online state of the interactive data identification when receiving the heartbeat packet of the interactive data identification, and maintains the online state of the first game data identification when receiving the heartbeat packet of the first game data identification.

Figure 4C:
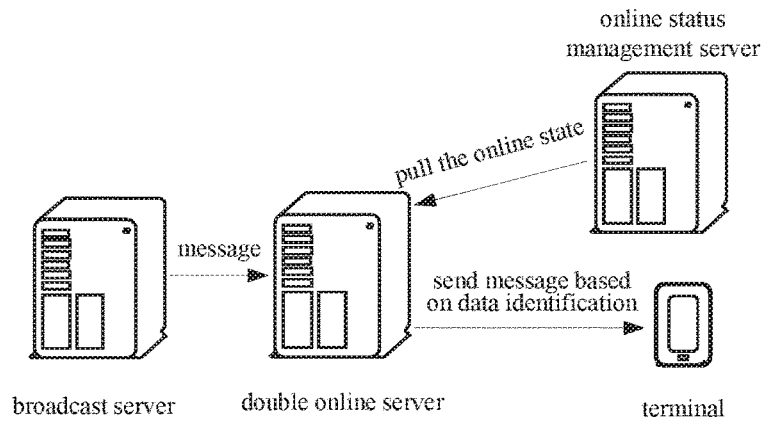
FIG. 4C is a signaling diagram of a broadcast message according to an embodiment of the present disclosure.

(3) Referring to FIG. 4C, taking a process of broadcasting a message as an example, the broadcast server generates a message to be broadcasted and sends the message to the double online server. Upon receipt of the message, the double online server determines the type of the message. If the message is an interactive message, the double online server searches the online status management server for an interactive data identification being an online state, acquires a user identification corresponding to the interactive data identification being the online state, and sends the message to a terminal indicated by the user identification. If the message is a game message, the double online server searches the online status management server for a game data identification being an online state, acquires a user identification corresponding to the game data identification being the online state, and sends the message to a terminal indicated by the user identification.

Compared with related game systems, a double online server is included in the game system according to the embodiments. The designated user identification of the terminal is replaced with an interactive data identification and a first game data identification by the double online server. When the terminal executes an interactive operation, the terminal interacts with other servers in the game system except the login server and the double online server based on the interactive data identification. When the terminal executes a game operation, the terminal interacts with the other servers in the game system based on the first game data identification. The other servers process interactive user data stored correspondingly to the interactive data identification based on only the interactive data identification, and process game user data stored correspondingly to the first game data identification based on only the first game data identification. That is, the other servers can determine user data to be processed based on only the currently used data identification, without determining which scene the user is currently in. In particular, for a large server cluster, the server cluster includes many servers. By generating the interactive data identification and the first game data identification by the double online server, traffic of other servers can greatly be reduced, thus traffic of the server cluster is reduced and work efficiency is improved.

Figure 5:
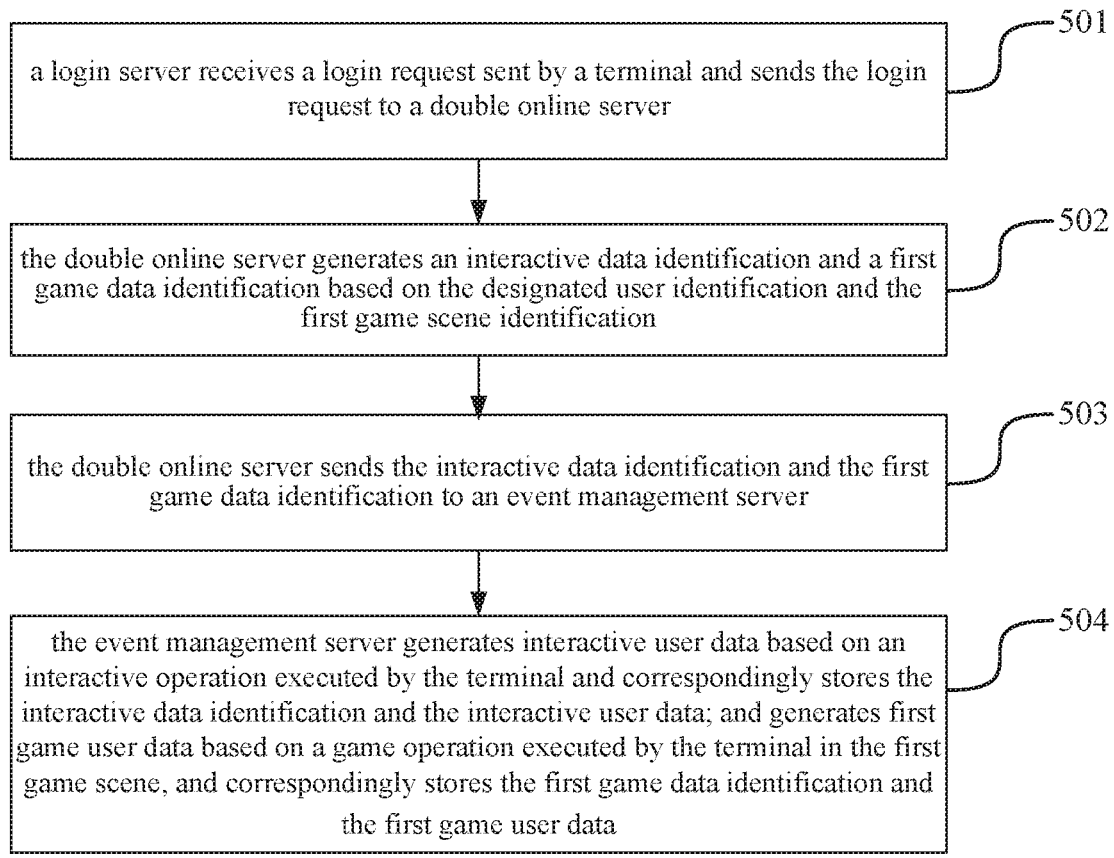
FIG. 5 is a flow chart of a method for storing user data according to an embodiment of the present disclosure.

Based on the system shown in FIGS. 4A to 4C, a method for storing user data includes the following steps 501 to 504, as shown in FIG. 5.

In step 501, a login server receives a login request sent by a terminal and sends the login request to a double online server. The login request includes a designated user identification of the terminal and a first game scene identification. The first game scene identification is configured to indicate a first game scene to be entered by the terminal.

Details of this step can be referred to above step 301.

In step 502, the double online server generates an interactive data identification and a first game data identification based on the designated user identification and the first game scene identification. The interactive data identification is configured to indicate interactive user data, and the first game data identification is configured to indicate game user data corresponding to the first game scene.

Details of this step can be referred to above step 302.

In an implementation, the process that the double online server generates the interactive data identification and the game data identification may include: the double online server generates the interactive data identification based on the designated user identification and a first character adjustment rule, and generates the first game data identification based on the designated user identification, the first game scene identification and a second character adjustment rule.

Details of this process can be referred to above step 302.

In an implementation, an online status management server may set states of the interactive data identification and the first game data identification, and the corresponding process may include: the double online server sends the interactive data identification and the first game data identification to the online status management server, and the online status management server sets the interactive data identification to be an online state and sets the first game data identification to be an online state.

The double online server, after generating the interactive data identification and the first game data identification, may send the generated interactive data identification and first game data identification to the online status management server. The online status management server may set the interactive data identification to be an online state and set the first game data identification to be an online state. Details of the process can be referred to above step 303.

In step 503, the double online server sends the interactive data identification and the first game data identification to an event management server.

The double online server, after generating the interactive data identification and the first game data identification, may send the generated interactive data identification and the generated first game data identification to the event management server, so that the event management server can perform subsequent processes based on the interactive data identification and the first game data identification.

In step 504, the event management server generates interactive user data based on an interactive operation executed by the terminal and correspondingly stores the interactive data identification and the interactive user data; and generates first game user data based on a game operation executed by the terminal in the first game scene, and correspondingly stores the first game data identification and the first game user data.

Details of this step can be referred to above step 304.

In an implementation, the event management server may be configured to process a data processing request sent by the terminal, and the corresponding process may include: the event management server receives the data processing request sent by the terminal, acquires interactive user data stored correspondingly to the interactive data identification if the data processing request includes the interactive data identification; and processes the acquired interactive user data based on the data processing request.

In the process of performing an operation by the terminal in the first game scene, the game server may request other servers to process interactive user data of the terminal based on the interactive data identification, or request other servers to process game user data of the terminal based on the first game data identification. Alternatively, the event management server of the game server may process the interactive user data and the game user data. In a case of processing by the event management server, the event management server may receive a data processing request sent by the terminal. The data request may be sent to the event management server by the terminal, or may be sent to the double online server by the terminal and then forwarded to the event management server by the double online server. The data processing request may include the interactive data identification, or may include the first game data identification. If the data processing request includes the interactive data identification, it is indicated that the data processing request is to request processing the interactive user data, then the interactive user data stored correspondingly to the interactive data identification is acquired, and the acquired interactive user data is processed based on the data processing request. If the data processing request includes the first game data identification, it is indicated that the data processing request is to request processing the first game user data, then the first game user data stored correspondingly to the first game data identification is acquired, and the acquired first game user data is processed based on the data processing request.

If the data processing request includes the interactive data identification, details of the process can be referred to above step 306.

If the data processing request includes the first game data identification, the event management server acquires first game user data stored correspondingly to the first game data identification, and processes the acquired first game user data based on the data processing request. Details of the process can be referred to above step 307.

In an implementation, when playing a game, the user may switch game scenes, and the corresponding process may include: the double online server receives a scene switching request sent by the terminal, where the scene switching request includes the designated user identification and a second game scene identification and the second game scene identification is configured to indicate a second game scene to be entered by the terminal; the double online server generates a second game data identification based on the designated user identification and the second game scene identification, where the second game data identification is configured to indicate second game user data corresponding to the second game scene; the double online server sends the second game data identification to an online status management server; the online status management server receives the second game data identification, sets the first game data identification to be an offline state and sets the second game data identification to be an online state; the double online server sends the second game data identification to the event management server; the event management server generates second game user data based on a game operation executed by the terminal in the second game scene and correspondingly stores the second game data identification and the second game user data.

Details of the process can be referred to relevant part of above step 303.

In the method provided by the embodiments of the present disclosure, when a login request of the terminal is received, the interactive data identification and the first game data identification are generated based on the designated user identification of the terminal and the first game scene identification of the game scene to be entered by the terminal. If interactive user data is generated based on an interactive operation executed by the terminal, the interactive data identification and the interactive user data are correspondingly stored. If first game user data is generated based on a game operation executed by the terminal in the first game scene, the first game data identification and the first game user data are correspondingly stored. The interactive data identification can be configured to indicate the interactive user data and the first game data identification can be configured to indicate the first game user data. User data in different scenes are isolated, thereby realizing uniqueness of indicated data and improving flexibility. User data to be processed can be determined based on the currently used data identification, and there is no need to determine which scene the user is currently in. The above operations are simple. When the game scene is switched, a new game scene identification is generated, thereby the operations are simple and the scalability is strong.

Figure 6:
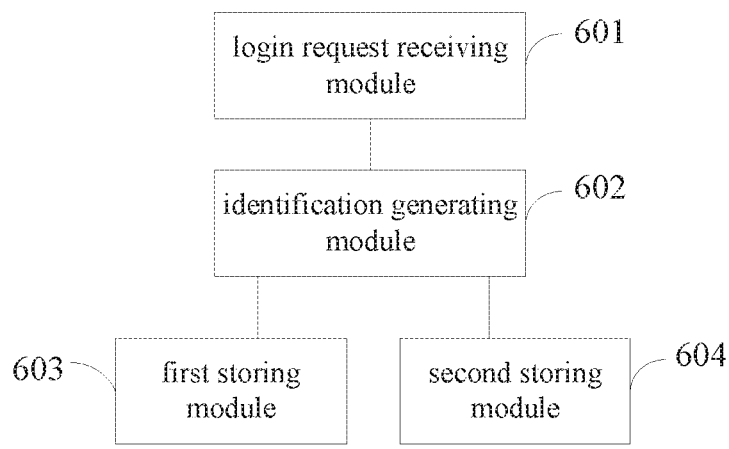
FIG. 6 is a schematic structural diagram of an apparatus for storing user data according to an embodiment of the present disclosure.

FIG. 6 is a schematic structural diagram of an apparatus for storing user data according to an embodiment of the present disclosure. Referring to FIG. 6, the apparatus includes a login request receiving module 601, an identification generating module 602, a first storing module 603 and a second storing module 604.

The login request receiving module 601 is configured to receive a login request of a terminal, where the login request includes a designated user identification of the terminal and a first game scene identification, and the first game scene identification is configured to indicate a first game scene to be entered by the terminal.

The identification generating module 602 is configured to generate an interactive data identification and a first game data identification based on the designated user identification and the first game scene identification, where the interactive data identification is configured to indicate interactive user data and the first game data identification is configured to indicate first game user data corresponding to the first game scene.

The first storing module 603 is configured to generate the interactive user data based on an interactive operation executed by the terminal and store the interactive data identification and the interactive user data correspondingly.

The second storing module 604 is configured to generate the first game user data based on a game operation executed by the terminal in the first game scene and store the first game data identification and the first game user data correspondingly.

In the apparatus provided by one of the embodiments of the present disclosure, when a login request of a terminal is received, an interactive data identification and a first game data identification are generated based on a designated user identification of the terminal and a first game scene identification of a game scene to be entered by the terminal. If interactive user data is generated based on an interactive operation executed by the terminal, the interactive data identification and the interactive user data are correspondingly stored. If first game user data is generated based on a game operation executed by the terminal in the first game scene, the first game data identification and the first game user data are correspondingly stored. The interactive data identification is configured to indicate the interactive user data and the first game data identification is configured to indicate the first game user data. User data in different scenes are isolated, thereby realizing uniqueness of indicated data and improving flexibility. User data to be processed can be determined based on the currently used data identification, and there is no need to determine which scene the user is currently in. The above operations are simple.

In an implementation, the apparatus further includes a processing request receiving module, a first data acquiring module and a first processing module.

The processing request receiving module is configured to receive a data processing request.

The first data acquiring module is configured to acquire the interactive user data stored correspondingly to the interactive data identification in a case that the data processing request includes the interactive data identification.

The first processing module is configured to process the acquired interactive user data based on the data processing request.

In an implementation, the apparatus further includes a second data acquiring module and a second processing module.

The second data acquiring module is configured to acquire the first game user data stored correspondingly to the first game data identification in a case that the data processing request includes the first game data identification.

The second processing module is configured to process the acquired first game user data based on the data processing request.

In an implementation, the apparatus further includes: a switching request receiving module, a state setting module and a third storing module.

The switching request receiving module is configured to receive a scene switching request sent by the terminal, where the scene switching request includes the designated user identification and a second game scene identification and the second game scene identification is configured to indicate a second game scene to be entered by the terminal.

The identification generating module 602 is further configured to generate a second game data identification based on the designated user identification and the second game scene identification, where the second game data identification is configured to indicate second game user data corresponding to the second game scene.

The state setting module is configured to set the first game data identification to be an offline state and set the second game data identification to be an online state.

The third storing module is configured to generate the second game user data based on a game operation executed by the terminal in the second game scene and store the second game data identification and the second game user data correspondingly.

In an implementation, the apparatus further includes a state setting module.

The state setting module is configured to set the interactive data identification to be an online state and set the first game data identification to be an online state.

In an implementation, the identification generating module is configured to:

generate the interactive data identification based on the designated user identification and a first character adjustment rule; and generate the first game data identification based on the designated user identification, the first game scene identification and a second character adjustment rule.

All the above implementations can be combined with each other arbitrarily if there is no conflict, which is not described in detail herein.

It is to be noted that, the above apparatus for storing user data is described by taking the above division of function modules are an example. In practice, the functions can be completed by different functional modules as needed, that is, the internal structure of the game server can be divided differently from the above to complete all or part of the above described functions. In addition, the apparatus for storing user data and the method for storing user data have similar features and can be referred to each other.

Figure 7:
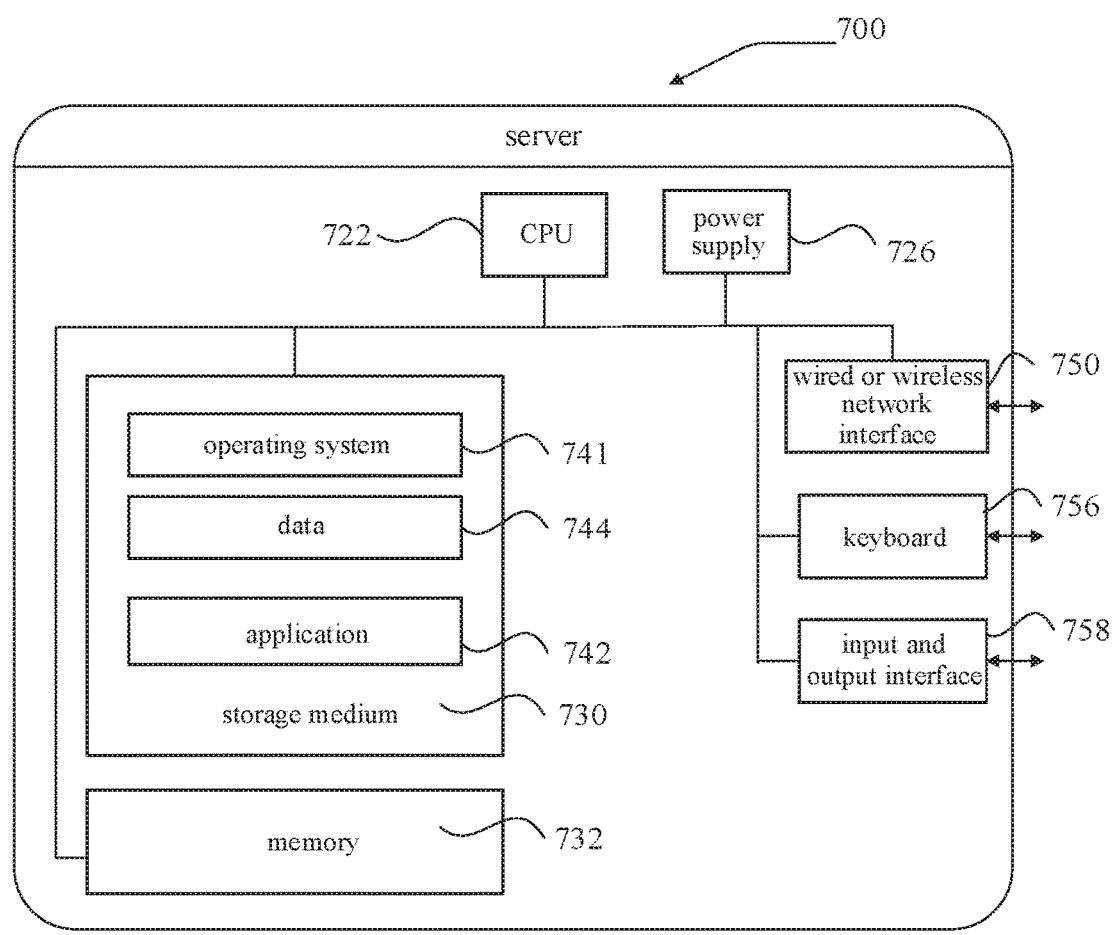
FIG. 7 is a schematic structural diagram of a server according to an embodiment of the present disclosure.

FIG. 7 is a schematic structural diagram of a server according to an embodiment of the present disclosure. Referring to FIG. 7, the server 700 may be configured differently based on configurations or performances, and the server 700 may include one or more central processing units (CPU) 722 (e.g., one or more processors), a memory 732, and one or more storage medium 730 (e.g., one or more mass storage devices) for storing application 742 or data 744. The memory 732 and the storage media 730 may be transient or persistent storage. The program stored in the storage medium 730 may include one or more modules (not shown in FIG. 7), and each module, such as described in FIG. 6, may include a series of instructions. Further, the CPU 722 may be communicated with the storage medium 730, and executes a series of instructions stored in the storage medium 730 on the server 700.

The server 700 may further include one or more power supplies 726, one or more wired or wireless network interfaces 750, one or more input and output interfaces 758, one and more keyboards 756, and/or one or more operating systems 741, such as Windows Server™, Mac OS X™, Unix™, Linux™, FreeBSD™.

In an implementation, when the instructions stored in the non-transitory storage medium 730 are executed by the processor 722, the process 722 may be caused to:

receive a login request of a terminal, where the login request includes a designated user identification of the terminal and a first game scene identification, and the first game scene identification is configured to indicate a first game scene to be entered by the terminal;

generate an interactive data identification and a first game data identification based on the designated user identification and the first game scene identification, where the interactive data identification is configured to indicate interactive user data and the first game data identification is configured to indicate first game user data corresponding to the first game scene;

generate the interactive user data based on an interactive operation executed by the terminal and store the interactive data identification and the interactive user data correspondingly; and generate the first game user data based on a game operation executed by the terminal in the first game scene and store the first game data identification and the first game user data correspondingly.

In an implementation, the instructions further cause the processor to:

receive a data processing request;

acquire the interactive user data stored correspondingly to the interactive data identification in a case that the data processing request includes the interactive data identification; and process the acquired interactive user data based on the data processing request.

In an implementation, the instructions further cause the processor to:

receive a data processing request;

acquire the first game user data stored correspondingly to the first game data identification in a case that the data processing request includes the first game data identification; and process the acquired first game user data based on the data processing request.

In an implementation, the instructions further cause the processor to:

receive a scene switching request sent by the terminal, where the scene switching request includes the designated user identification and a second game scene identification and the second game scene identification is configured to indicate a second game scene to be entered by the terminal;

generate a second game data identification based on the designated user identification and the second game scene identification, where the second game data identification is configured to indicate second game user data corresponding to the second game scene;

set the first game data identification to be an offline state and set the second game data identification to be an online state; and generate the second game user data based on a game operation executed by the terminal in the second game scene and store the second game data identification and the second game user data correspondingly.

In an implementation, the instructions further cause the processor to:

set the interactive data identification to be an online state and set the first game data identification to be an online state.

In an implementation, the instructions further cause the processor to:

generate the interactive data identification based on the designated user identification and a first character adjustment rule; and generate the first game data identification based on the designated user identification, the first game scene identification and a second character adjustment rule.

It can be understood by those skilled in the art that all or some of steps according to the above embodiments may be implemented by hardware, or may be implemented by hardware instructed by a program. The program may be stored in a computer-readable storage medium, which may be a read-only memory, a magnetic disk or an optical disk.

The above only describes some embodiments of the present disclosure but not used to limit the disclosure. Any modifications, equivalent replacements or variations within the spirit and principle of the disclosure shall be included in the scope of the protection.

What is claimed is:

1. A method for storing user data performed by a game server, comprising:
   receiving a login request of a terminal, wherein the login request comprises a designated user identification of the terminal and a first game scene identification, and the first game scene identification is configured to indicate a first game scene to be entered by the terminal;
   generating an interactive data identification and a first game data identification based on the designated user identification and the first game scene identification, wherein the interactive data identification is configured to indicate interactive user data, and the first game data identification is configured to indicate first game user data corresponding to the first game scene;
   generating the interactive user data based on an interactive operation executed by the terminal, and storing the interactive data identification and the interactive user data correspondingly; and
   generating the first game user data based on a game operation executed by the terminal in the first game scene, and storing the first game data identification and the first game user data correspondingly,
   wherein:
      the interactive operation indicates an operation of the terminal interacting with other users, and
      the game operation indicates an operation of the terminal operating a game role, and the game role is generated by the game server for the terminal in a game scene.

2. The method according to claim 1, further comprising:
   receiving a data processing request;
   acquiring the interactive user data stored correspondingly to the interactive data identification in a case that the data processing request comprises the interactive data identification; and
   processing the acquired interactive user data based on the data processing request.

3. The method according to claim 1, further comprising:
   receiving a data processing request;
   acquiring the first game user data stored correspondingly to the first game data identification in a case that the data processing request comprises the first game data identification; and
   processing the acquired first game user data based on the data processing request.

4. The method according to claim 1, further comprising:
   receiving a scene switching request sent by the terminal, wherein the scene switching request comprises the designated user identification and a second game scene identification, and the second game scene identification is configured to indicate a second game scene to be entered by the terminal;
   generating a second game data identification based on the designated user identification and the second game scene identification, wherein the second game data identification is configured to indicate second game user data corresponding to the second game scene;
   setting a state of the first game data identification to be offline;
   setting a state of the second game data identification to be online;
   generating the second game user data based on a game operation executed by the terminal in the second game scene; and
   storing the second game data identification and the second game user data correspondingly.

5. The method according to claim 1, wherein after generating the interactive data identification and the first game data identification based on the designated user identification and the first game scene identification, the method further comprises:
   setting a state of the interactive data identification to be online; and
   setting a state of the first game data identification to be online.

6. The method according to claim 1, wherein generating the interactive data identification and the first game data identification based on the designated user identification and the first game scene identification comprises:
   generating the interactive data identification based on the designated user identification and a first character adjustment rule; and
   generating the first game data identification based on the designated user identification, the first game scene identification and a second character adjustment rule.

7. A method for storing user data performed by a server cluster, wherein the server cluster comprises a login server, a double online server, an event management server, and wherein the method comprises:
   receiving, by the login server, a login request sent by a terminal and sending, by the login server, the login request to the double online server, wherein the login request comprises a designated user identification of the terminal and a first game scene identification, and the first game scene identification is configured to indicate a first game scene to be entered by the terminal;
   generating, by the double online server, an interactive data identification and a first game data identification based on the designated user identification and the first game scene identification, wherein the interactive data identification is configured to indicate interactive user data, and the first game data identification is configured to indicate first game user data corresponding to the first game scene;
   sending, by the double online server, the interactive data identification and the first game data identification to the event management server;
   generating, by the event management server, the interactive user data based on an interactive operation executed by the terminal and storing the interactive data identification and the interactive user data correspondingly, and
   generating, by the event management server, the first game user data based on a game operation executed by the terminal in the first game scene and storing the first game data identification and the first game user data correspondingly, wherein:
the interactive operation indicates an operation of the terminal interacting with other users, and
the game operation indicates an operation of the terminal operating a game role, and the game role is generated by the game server for the terminal in a game scene.

8. The method according to claim 7, further comprising:
receiving, by the event management server, a data processing request sent by the terminal;
acquiring, by the event management server, the interactive user data stored correspondingly to the interactive data identification in a case that the data processing request comprises the interactive data identification; and
processing, by the event management server, the acquired interactive user data based on the data processing request.

9. The method according to claim 7, further comprising:
receiving, by the event management server, a data processing request sent by the terminal;
acquiring, by the event management server, the first game user data stored correspondingly to the first game data identification in a case that the data processing request comprises the first game data identification; and
processing, by the event management server, the acquired first game user data based on the data processing request.

10. The method according to claim 7, further comprising:
receiving, by the double online server, a scene switching request sent by the terminal, wherein the scene switching request comprises the designated user identification and a second game scene identification, and the second game scene identification is configured to indicate a second game scene to be entered by the terminal;
generating, by the double online server, a second game data identification based on the designated user identification and the second game scene identification, wherein the second game data identification is configured to indicate second game user data corresponding to the second game scene;
sending, by the double online server, the second game data identification to an online status management server;
receiving, by the online status management server, the second game data identification, setting a state of the first game data identification to be offline and setting a state of the second game data identification to be online;
sending, by the double online server, the second game data identification to the event management server; and
generating, by the event management server, the second game user data based on a game operation executed by the terminal in the second game scene and storing the second game data identification and the second game user data correspondingly.

11. The method according to claim 7, wherein after generating, by the double online server, the interactive data identification and the first game data identification based on the designated user identification and the first game scene identification, the method further comprises:
sending, by the double online server, the interactive data identification and the first game data identification to the online status management server; and
setting, by the online status management server, a state of the interactive data identification to be online and setting, by the online status management server, a state of the first game data identification to be online.

12. The method according to claim 7, wherein generating, by the double online server, the interactive data identification and the first game data identification based on the designated user identification and the first game scene identification comprises:
generating, by the double online server, the interactive data identification based on the designated user identification and a first character adjustment rule; and
generating, by the double online server, the first game data identification based on the designated user identification, the first game scene identification and a second character adjustment rule.

13. An apparatus for storing user data applied to a game server, comprising a processor and a non-transitory storage medium having a plurality of instructions stored thereon that, when executed by the processor, cause the processor to:
receive a login request of a terminal, wherein the login request comprises a designated user identification of the terminal and a first game scene identification, and the first game scene identification is configured to indicate a first game scene to be entered by the terminal;
generate an interactive data identification and a first game data identification based on the designated user identification and the first game scene identification, wherein the interactive data identification is configured to indicate interactive user data and the first game data identification is configured to indicate first game user data corresponding to the first game scene;
generate the interactive user data based on an interactive operation executed by the terminal and store the interactive data identification and the interactive user data correspondingly; and
generate the first game user data based on a game operation executed by the terminal in the first game scene and store the first game data identification and the first game user data correspondingly, wherein:
the interactive operation indicates an operation of the terminal interacting with other users, and
the game operation indicates an operation of the terminal operating a game role, and the game role is generated by the game server for the terminal in a game scene.

14. The apparatus according to claim 13, further comprising instructions that cause the processor to:
receive a data processing request;
acquire the interactive user data stored correspondingly to the interactive data identification in a case that the data processing request comprises the interactive data identification; and
process the acquired interactive user data based on the data processing request.

15. The apparatus according to claim 13, further comprising instructions that cause the processor to:
receive a data processing request;
acquire the first game user data stored correspondingly to the first game data identification in a case that the data processing request comprises the first game data identification; and
process the acquired first game user data based on the data processing request.

16. The apparatus according to claim 13, further comprising instructions that cause the processor to:
- receive a scene switching request sent by the terminal, wherein the scene switching request comprises the designated user identification and a second game scene identification and the second game scene identification is configured to indicate a second game scene to be entered by the terminal;
- generate a second game data identification based on the designated user identification and the second game scene identification, wherein the second game data identification is configured to indicate second game user data corresponding to the second game scene;
- set a state of the first game data identification to be offline and set a state of the second game data identification to be online; and
- generate the second game user data based on a game operation executed by the terminal in the second game scene and store the second game data identification and the second game user data correspondingly.

17. The apparatus according to claim 13, further comprising instructions that cause the processor to:
- set a state of the interactive data identification to be online and set a state of the first game data identification to be online.

18. The apparatus according to claim 13, further comprising instructions that cause the processor to:
- generate the interactive data identification based on the designated user identification and a first character adjustment rule; and
- generate the first game data identification based on the designated user identification, the first game scene identification and a second character adjustment rule.

* * * * *